United States Patent [19]

Sherif et al.

[11] Patent Number: 4,505,752

[45] Date of Patent: Mar. 19, 1985

[54] FAST-SETTING CEMENTS FROM SOLID PHOSPHORUS PENTOXIDE CONTAINING MATERIALS

[75] Inventors: Fawzy G. Sherif, Stony Point, N.Y.; Edwin S. Michaels, Fairfield, Conn.

[73] Assignee: Stauffer Chemical Company, Westport, Conn.

[21] Appl. No.: 522,074

[22] Filed: Aug. 11, 1983

[51] Int. Cl.$^3$ ................................................ C04B 9/04
[52] U.S. Cl. ...................................... 106/85; 501/111; 501/123; 501/125; 501/133; 501/155
[58] Field of Search ............... 501/111, 123, 125, 133, 501/155; 106/85

[56] References Cited

U.S. PATENT DOCUMENTS

| | | | | |
|---|---|---|---|---|
| 3,202,520 | 8/1965 | Enoch | | 106/85 |
| 3,525,632 | 8/1970 | Enoch | | 106/85 |
| 3,673,111 | 6/1972 | Hovarth | | 252/435 |
| 3,821,006 | 6/1974 | Schwartz | | 106/85 |
| 3,879,209 | 4/1975 | Limes et al. | | 501/111 |
| 4,030,936 | 6/1977 | Willis | | 106/85 |
| 4,059,455 | 11/1977 | Limes et al. | | 106/85 |
| 4,152,167 | 5/1979 | Horvitz et al. | | 106/85 |
| 4,174,227 | 11/1979 | Tomic | | 106/85 |

*Primary Examiner*—James Poer
*Attorney, Agent, or Firm*—Hensley M. Flash

[57] ABSTRACT

A dry blend capable of forming a fast-setting cement when reacted with an aqueous component. The blend comprises: a solid phosphorus pentoxide ($P_2O_5$) containing component; a solid component comprising a magnesium containing compound; and an optional aggregate.

The solid $P_2O_5$ containing component is preferably spent solid phosphoric acid catalyst.

The dry blend remains a free flowing powder until contacted with the aqueous component, preferably water, then a reaction occurs forming a fast-setting cement.

51 Claims, No Drawings

FAST-SETTING CEMENTS FROM SOLID PHOSPHORUS PENTOXIDE CONTAINING MATERIALS

BACKGROUND OF THE INVENTION

1. Field of the Invention

This invention relates to fast-setting cementitious compositions. More particularly, it relates to fast-setting cementitious compositions derived from solid phosphorus pentoxide ($P_2O_5$) containing materials.

2. Related Art

Fast-setting cementitious compositions having utility for various purposes for which concretes are employed have been heretofore known.

U.S. Pat. No. 3,202,520 (Enoch, Aug. 8, 1965) discloses a rapid set non-hygroscopic cement composition consisting essentially of a blend of a phosphate derived from phosphoric acid and of alumina, and containing from 15 to 55 weight percent of $P_2O_5$ and from 45 to 75 weight percent of alumina, and from 5 to 18 weight percent of magnesium oxide. The phosphoric acid is used in its liquid state then moisture is removed by drying the blend above 212° F.

U.S. Pat. No. 3,525,632 (Enoch, Aug. 25, 1970) discloses a rapid setting concrete cement composition which comprises dry blending magnesium containing compounds, aluminum containing compounds and phosphorus containing compounds from stated sources in stated weight percentages, and then pulverizing the blended material without a separate drying stage. The phosphorus containing compound is a mixture derived from phosphoric acid, and at least 50 weight percent of one of trimagnesium phosphate, aluminum orthophosphate, and phosphoric anhydride.

U.S. Pat. No. 3,879,209 (Limes et al., Apr. 22, 1975) discloses a process for making a fast-setting concrete comprising establishing a mixture of an aggregate, containing at least 10 percent by weight of magnesia, and ammonium phosphates in aqueous solution. This patent further discloses that a commercial (agriculture fertilizer) product known as sequestered phosphatic solution (SPS) is particularly suitable as the source of the ammonium phosphate. The ammonium component is an essential feature of this invention.

U.S. Pat. No. 4,059,455 (Limes et al., Nov. 22, 977) discloses a process for making a fast-setting concrete comprising establishing a mixture of an aggregate, containing at least 1% magnesia, and ammonium phosphates in aqueous solution. Again, the ammonium component is essential for attainment of the desired results of the invention.

U.S. Pat. No. 4,174,227 (Tomic, Nov. 13, 1979) discloses a grouting system comprising an acidic reactive component comprising at least one acidic oxy phosphorus compound selected from phosphoric acids, anhydrides of phosphoric acids and salts of phosphoric acids with multivalent metal cations; and a basic reactive component comprising at least one basic metal compound of a Group II or Group III metal capable of reacting with the oxy phosphorus compound(s) in the presence of water to form a monolithic solid. This patent teaches that the monovalent salts of phosphoric acid, e.g., the ammonium phosphates, do not develop early pull strength.

U.S. Pat. No. 3,821,006 (Schwartz, June 28, 1974) discloses a patching composition consisting essentially of a reactive component of MgO with an acid phosphate salt and an inert aggregate component. The particle size of the inert aggregate component is related to the compressive strength of the cement formed at an early cure age.

The mixtures employed in the methods of the patents discussed above set and develop usable strength much more rapidly than conventional materials. Nonetheless each of these patents is limited (as discussed above) and therefore distinguishable from the mixtures and processes of the present invention in several ways.

A fast-setting cementitious composition in which the phosphorus pentoxide reactive components are solids and further are derived from industrial wastes would be advantageous in that an economic, solid blend could be easily transported to the intended application site, then combined at the site with an aqueous component to form a monolithic solid. It would be even more advantageous to utilize a solid waste that heretofore has created significant disposal problems.

It is an object of the present invention to provide fast-setting cementitious compositions derived from solid phosphorus pentoxide containing waste materials.

Other objects and advantages of the present invention are shown throughout the specification.

SUMMARY OF THE INVENTION

In accordance with the present invention, it has now been discovered that a fast-setting cement can be formed when a dry blend is reacted with an aqueous component. The dry blend comprises: a solid phosphorus pentoxide containing reactive component; and a solid component comprising a magnesium containing compound. The solid component is capable of being dry blended with the phosphorus pentoxide component without reacting therewith and is further capable of reacting with the phosphorus pentoxide component in the presence of the aqueous component to form a monolithic solid. The dry blend can further be comprised of an aggregate.

This invention further comprises a process for treating solid phosphorus pentoxide containing waste. The steps of this process comprises: dry blending the phosphorus pentoxide waste with a solid component comprising a magnesium containing compound, said solid component capable of reacting with said phosphorus pentoxide waste in the presence of an aqueous component to form a monolithic solid; and reacting the dry blend with an aqueous component so that a fast-setting cement is formed. This process can further include the step of blending an aggregate into the dry blend prior to the reaction with the aqueous component.

DETAILED DESCRIPTION OF THE INVENTION

The present invention comprises the formation of a fast-setting cement when a dry blend formulated in accordance with this invention is reacted with an aqueous component. Generally, the fast-setting cement of this invention can be used for producing fast-setting concrete structures, e.g., structures suitable for roadway patches or other load-bearing uses, however in its broader aspects, the invention is generally applicable to preparing concrete structures with various characteristics, e.g., high or low strength, for a variety of other purposes as well. The characteristics of any particular concrete structures formed can depend upon the weight ratio of the various components, the nature of the aggregate employed, the temperature conditions of application and the curing conditions as well as other factors.

Fast-setting cement can be applied indoors or outdoors to concrete drives, storage yards, warehouse and factory floors to repair and restore damaged surfaces. Fast-setting cement can be used to fill structural cracks in slabs, and repair highway median barrier walls. This type of cement can be used in almost any situation requiring a quick permanent repair of concrete.

Fast-setting cement can be used for making various objects and as a fire-proof protective coating for various flammable substrates. The cement can also be used as an adhesive for wood, glass, metal and the like.

As a general rule, the setting time for fast-setting cement can range from a few seconds to a few hours. As a practical matter, the setting time must be sufficient to allow the dry blend to be thoroughly mixed with the aqueous component to form a slurry or a non-collapsible putty and be applied to the intended area, whether a mold or a patch, prior to hardening into a monolithic solid. In quantitative terms, fast setting means that the cement hardens in less than 30 minutes, usually in about 1 to 10 minutes, and reaches more than 500 psi of compression strength in usually less than two hours.

The dry blend of the present invention comprises a solid phosphorus pentoxide containing reactive component and a solid component comprising a magnesium containing compound. The dry blend can further comprise an aggregate.

The solid $P_2O_5$ containing reactive component can be selected from various industrial and agricultural solid wastes, e.g., spent solid phosphoric acid catalysts.

Solid phosphoric acid (SPA) catalysts are useful in hydrocarbon conversions and are usually prepared by admixing a siliceous adsorbent with an oxygen acid of phosphorus prior to heat treatment, extrusion and drying as described in U.S. Pat. No. 3,673,111 (Hovarth et al., June 27, 1972). Spent SPA catalyst is an industrial waste. The industry has long been interested in reclaiming the phosphate value of this material. Attempts to formulate spent SPA catalysts into fertilizer products have been disfavored because of probable interfering trace impurities.

| Typical Spent SPA Analysis | |
|---|---|
| pH | 1.7–2.0 |
| Free $P_2O_5$, wt % | 16–20 |
| Total $P_2O_5$, wt % | 50–60 |
| $N_2$ bases as $NH_3$, wt % | 0–2 |
| Carbon, wt % | 1–7 |
| $SiO_2$, wt % | about 25 |

The essential and active ingredient of SPA catalyst is an acid of phosphorus, preferably one in which the phosphorus has a valence of +5. The acid may constitute from about 60 to about 80 weight % or more of the catalyst, and in most cases is over 50 weight % thereof. Of the various acids of phosphorus, orthophosphoric acid ($H_3PO_4$) and pyrophosphoric acid ($H_4P_2O_7$) find general application in SPA catalysts. However, SPA catalysts are not restricted to these acids. Triphosphoric acid ($H_5P_3O_{10}$), tetraphosphoric acid ($H_6P_4O_{13}$), other polyphosphoric acids and mixtures of these and the acids discussed above can be used or formed in the preparation of SPA catalysts.

The solid $P_2O_5$ containing reactive component can usually be selected from most solid materials containing free or available $P_2O_5$. This solid $P_2O_5$ containing component can be comprised of various mixtures of solid materials containing free or available $P_2O_5$. When SPA catalysts are made, the aggregates and dust formed as byproducts during the manufacturing process can be used as a source of the solid phosphorus pentoxide reactive component. When this particular material is used, improved cement performance can be achieved by activating this $P_2O_5$ material to form an activated solid $P_2O_5$ containing material.

The steps of the activating process comprises: (1) mixing a $P_2O_5$ waste material with water in a weight ratio of waste to water ranging from about 50:1 to about 3:1; (2) heating the waste/water mix from about 40° C. to about 100° C.; and then (3) drying this heated waste/water mix at about 120° C to form an activated solid $P_2O_5$ containing material. This activated material can then be used as the solid reactive $P_2O_5$ containing component in all the various facets of this invention. This activating process can be used on solid $P_2O_5$ containing materials from various sources to achieve improved cement performance.

The solid $P_2O_5$ containing component is dry blended with a solid component. This solid component comprises a magnesium containing compound. These compounds must be capable of being dry blended with the solid $P_2O_5$ containing component without reacting therewith and further they must be capable of reacting with the solid $P_2O_5$ containing component in the presence of an aqueous component to form a monolithic solid. Such compounds include magnesium oxide, magnesium hydroxide, and magnesium carbonate. The solid component of the dry blend must contain at least one of these listed compounds. Mixtures of these listed compounds can also be employed.

In the present dry blend, it has been found that the spent SPA catalyst works best when it is milled and classified to allow its particles to pass through 20 mesh and remain upon 325 mesh. The magnesium containing compounds can also be milled and classified to allow their particles to pass through 20 mesh and remain upon 325 mesh.

The molar ratio of the $P_2O_5$ contained within the reactive component to the magnesium contained within the solid component can range from about 1:1 to about 1:20. Generally, there is no advantage to exceeding this ratio to any larger degree inasmuch as the cheaper aggregate can be used to increase the solids content without deleterious effect.

A particulate aggregate, preferably graded sand, can be included in the dry blend in a controlled amount as a filler. Aggregate greatly enhance the strength of the hardened concrete cement. Other aggregate materials which can be used include particles of competent rocks or rock-forming minerals such as granite, basalt, dolomite, andesite, feldspars, amphiboles, pyroxenes, olivine, gabbro, rhyolite, syenite, diorite, dolerite, peridotite, trachyte, obsidian, quartz, etc., as well as materials such as slag, cinders, fly ash, glass cullet, and fibrous materials such as chopped metal wire (preferably steel), glass fibers, asbestos, cotton and polyester and aramide fibers. Aggregates having different particle shapes and sizes can be used. Mixtures of different aggregates can also be used. When spent SPA catalyst is used as the reactive component, the siliceous adsorbent contained therein functions as an aggregate.

This invention further comprises the process of reacting the dry blend of $P_2O_5$ containing waste and a solid component comprising a magnesium containing compound, and optionally an aggregate, with an aqueous component to form a fast-setting cement. This process provides a unique method that is economical as well as environmentally sound for treating solid $P_2O_5$ containing waste.

The dry blend remains a free flowing powder until it is contacted with an aqueous component, preferably water, then a reaction occurs forming a fast-setting cement. The amount of aqueous component used is important. Too much water can convert the dry blend into a thin slurry that will not set until substantial dehydration occurs; and, too little water will not wet the dry blend sufficiently to allow the necessary chemical reaction. The optimum amount of water will depend upon the particular physical characteristics of the constituents of the dry blend, e.g., absorbency, surface area, etc. However, the optimum amount of water must be sufficient to adequately wet the dry blend and optional aggregate mixture to form a thick slurry or non-collapsible putty. This optimum amount of water can be determined on a blend by blend basis.

The various dry blends of this invention and the process of combining them with an aqueous component result in the production of unique fast-setting cements.

The following Examples illustrate certain embodiments of the present invention but should not be construed in a limiting sense. The scope of protection sought is set forth in the claims which follow the Examples.

EXAMPLE 1

Spent SPA catalyst containing (by weight) 53.8% $P_2O_5$, 24.4% $SiO_2$ and 7.3% carbon was milled and classified to allow its particles to pass through a 40 mesh screen. 100 gms of these particles were blended with 35 gms of low reactivity MgO powder and 100 gms of silica aggregates having average particle size of 1.4 MM.

The resulting dry blend was thoroughly mixed with 50 gms of water. The slurry formed was poured into 2 inch cube molds.

The cement hardened within 10 minutes. The compression strength of the cement cubes formed was 600 psi after 2 hours and 1000 psi after 24 hours.

EXAMPLE 2

A bulk cement was prepared as in Example 1, except that 100 gms of spent SPA catalyst was blended with 170 gms of a premixed component containing (by weight) 20% MgO and 80% silica aggregates. The dry blend was mixed with 60 gms of water and the resulting slurry was poured into 2 inch cube molds. The cement hardened within 5 minutes. Compression strength of the cement cubes formed was 600 psi after 2 hours and 1100 psi after 7 days.

EXAMPLE 3

A bulk cement was prepared as in Example 1, except that the solid phosphorus pentoxide containing material was aggregates and dust formed as byproducts during the preparation of the solid phosphoric acid catalyst used in Example 1. This solid $P_2O_5$ containing waste material was treated to activate it prior to its use in making cement by mixing it with 20% of its weight of water then heating the resulting mix at 60° C. for 16 hours. The mix was then dried at 120° C. for 24 hours.

100 gms of this activated solid $P_2O_5$ containing waste was milled and classified to allow its particles to pass through 20 mesh and remain upon 325 mesh. The classified waste was then blended with 100 gms of a premixed component containing (by weight) 20% MgO and 80% silica aggregates.

The resulting dry blend was thoroughly mixed with 40 gms of water. The slurry formed was poured into 2 inch cube molds.

The cement hardened within 2 minutes. The compression strength of the cement cubes formed was 600 psi after 2 hours and 1558 psi after 20 days.

What is claimed is:

1. A dry blend capable of forming a fast-setting cement when reacted with an aqueous component comprising:
    (a) a solid phosphorus pentoxide containing waste reactive component; and
    (b) a solid component comprising a magnesium containing compound, said solid component capable of being dry blended with said phosphorus pentoxide component without reacting therewith and further capable of reacting with said phosphorus pentoxide component in the presence of said aqueous component to form a monolithic solid.

2. The dry blend of claim 1 further comprising an aggregate.

3. The dry blend of claim 1 wherein the molar ratio of the phosphorus pentoxide contained within said reactive component to the magnesium contained within said solid component ranges from about 1:1 to about 1:20.

4. The dry blend of claim 1 wherein the solid phosphorus pentoxide component is selected from industrial and agricultural wastes.

5. The dry blend of claim 1 wherein the solid phosphorus pentoxide component is spent solid phosphoric acid catalyst.

6. The dry blend of claim 1 wherein the solid phosphorus pentoxide component is aggregates and dust formed as byproducts during the manufacture of solid phosphoric acid catalyst.

7. The dry blend of claim 5 wherein the spent solid phosphoric acid catalyst contains from about 40% to about 80% by weight phosphorus pentoxide.

8. The dry blend of claim 5 wherein the spent solid phosphoric acid catalyst is milled and classified to allow the particles to pass through 20 mesh and remain upon 325 mesh.

9. The dry blend of claim 1 wherein the magnesium containing compound is magnesium oxide, hydroxide, carbonate, or mixtures thereof.

10. The dry blend of claim 2 wherein the solid phosphorus pentoxide component is selected from industrial and agricultural wastes.

11. The dry blend of claim 2 wherein the solid phosphorus pentoxide component is spent solid phosphoric acid catalyst.

12. The dry blend of claim 11 wherein the spent solid phosphoric acid catalyst contains from about 40% to about 80% by weight phosphorus pentoxide.

13. The dry blend of claim 2 wherein the solid phosphorus pentoxide component is aggregates and dust formed as byproducts during the manufacture of solid phosphoric acid catalyst.

14. The dry blend of claim 11 wherein the spent solid phosphoric acid catalyst is milled and classified to allow the particles to pass through 20 mesh and remain upon 325 mesh.

15. The dry blend of claim 2 wherein the magnesium containing compound is magnesium oxide, hydroxide, carbonate, or mixtures thereof.

16. A process for treating solid phosphorus pentoxide containing waste comprising:
  (a) dry blending said phosphorus pentoxide waste with a solid component comprising a magnesium containing compound, said solid component capable of reacting with said phosphorus pentoxide waste in the presence of an aqueous component to form a monolithic solid; and
  (b) reacting the dry blend with an aqueous component so that a fast-setting cement is formed.

17. A process for treating solid phosphorus pentoxide containing waste comprising:
  (a) activating said phosphorus pentoxide waste to form an activated solid phosphorus pentoxide containing waste by the steps comprising:
    (1) mixing said phosphorus pentoxide waste with water in a weight ratio of waste to water ranging from about 50:1 to about 3:1;
    (2) heating said waste/water mix from about 40° C. to about 100° C.;
    (3) then drying said heated waste/water mix at about 120° C.;
  (b) dry blending the activated solid phosphorus pentoxide containing waste formed in step (a) with a solid component comprising a magnesium containing compound, said solid component capable of reacting with said activated phosphorus pentoxide waste in the presence of an aqueous component to form a monolithic solid; and
  (c) reacting the dry blend with an aqueous component so that a fast-setting cement is formed.

18. The process of claim 17 further comprising the step of blending an aggregate into the dry blend prior to reacting with the aqueous component.

19. The process of claim 18 wherein the amount of aqueous component used is sufficient to wet the dry blend and aggregate mixture and form a non-collapsible putty.

20. The process of claim 17 further comprising the step of milling and classifying the activated solid phosphorus pentoxide containing waste formed in step (a) to allow the particles to pass through 20 mesh and remain upon 325 mesh prior to performing step (b).

21. The process of claim 17 wherein the solid phosphorus pentoxide waste is aggregates and dust formed as byproducts during the manufacture of solid phosphoric acid catalyst.

22. The process of claim 17 wherein the solid component is magnesium oxide, hydroxide, carbonate, or mixtures thereof.

23. The process of claim 16 further comprising the step of blending an aggregate into the dry blend prior to reacting with the aqueous component.

24. The process of claim 16 wherein the amount of aqueous component used is sufficient to wet the dry blend and form a non-collapsible putty.

25. The process of claim 16 wherein the molar ratio of the phosphorus pentoxide contained within said waste to the magnesium contained within said solid component ranges from about 1:1 to about 1:20.

26. The process of claim 16 wherein the solid phosphorus pentoxide waste is aggregates and dust formed as byproducts during the manufacture of solid phosphoric acid catalyst.

27. The process of claim 16 wherein the solid phosphorus pentoxide waste is spent solid phosphoric acid catalyst.

28. The process of claim 27 wherein the spent solid phosphoric acid catalyst contains from about 40% to about 80% by weight phosphorus pentoxide.

29. The process of claim 27 wherein the spent solid phosphoric acid catalyst is milled and classified to allow the particles to pass through 20 mesh and remain upon 325 mesh.

30. The process of claim 16 wherein the solid component is magnesium oxide, hydroxide, carbonate, or mixtures thereof.

31. The process of claim 23 wherein the solid phosphorus pentoxide waste is spent solid phosphoric acid catalyst.

32. The process of claim 31 wherein the spent solid phosphoric acid catalyst contains from about 40% to about 80% by weight phosphorus pentoxide.

33. The process of claim 31 wherein the spent solid phosphoric acid catalyst is milled and classified to allow the particles to pass through 20 mesh and remain upon 325 mesh.

34. The fast-setting cement resulting from the process of claim 16.

35. The fast-setting cement resulting from the process of claim 17.

36. The fast-setting cement resulting from the process of claim 18.

37. The fast-setting cement resulting from the process of claim 19.

38. The fast-setting cement resulting from the process of claim 20.

39. The fast-setting cement resulting from the process of claim 21.

40. The fast-setting cement resulting from the process of claim 22.

41. The fast-setting cement resulting from the process of claim 23.

42. The fast-setting cement resulting from the process of claim 24.

43. The fast-setting cement resulting from the process of claim 25.

44. The fast-setting cement resulting from the process of claim 26.

45. The fast-setting cement resulting from the process of claim 27.

46. The fast-setting cement resulting from the process of claim 28.

47. The fast-setting cement resulting from the process of claim 29.

48. The fast-setting cement resulting from the process of claim 30.

49. The fast-setting cement resulting from the process of claim 31.

50. The fast-setting cement resulting from the process of claim 32.

51. The fast-setting cement resulting from the process of claim 33.

* * * * *